(12) United States Patent
Bolasna et al.

(10) Patent No.: US 7,898,769 B2
(45) Date of Patent: Mar. 1, 2011

(54) THREE-ETCH ABS DESIGN WITH A CLOSED FRONT CHANNEL

(75) Inventors: Sanford Bolasna, San Jose, CA (US); Lee K. Dorius, San Jose, CA (US); Weidong Huang, San Jose, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 818 days.

(21) Appl. No.: 11/707,302

(22) Filed: Feb. 15, 2007

(65) Prior Publication Data

US 2008/0198509 A1    Aug. 21, 2008

(51) Int. Cl.
*G11B 5/33* (2006.01)
*G11B 17/32* (2006.01)

(52) U.S. Cl. .................................. 360/236.2; 360/235.5
(58) Field of Classification Search .................. 360/236, 360/236.2, 236.3, 236.4, 235.5, 235.6, 235.7, 360/235.8
See application file for complete search history.

(56) References Cited

U.S. PATENT DOCUMENTS

| | | | |
|---|---|---|---|
| 6,178,064 B1 * | 1/2001 | Chang et al. | 360/235.6 |
| 6,222,811 B1 * | 4/2001 | Sakurai et al. | 720/620 |
| 6,560,071 B2 * | 5/2003 | Chapin et al. | 360/235.7 |
| 6,892,384 B2 * | 5/2005 | Kim et al. | 720/623 |
| 7,191,454 B2 * | 3/2007 | Araki | 720/623 |
| 7,340,752 B2 * | 3/2008 | Araki | 720/623 |
| 7,477,486 B1 * | 1/2009 | Sun et al. | 360/236.3 |
| 7,583,473 B2 * | 9/2009 | Bolasna et al. | 360/236.2 |
| 7,616,405 B2 * | 11/2009 | Hu et al. | 360/236.2 |
| 2002/0030938 A1 * | 3/2002 | Boutaghou et al. | 360/236.3 |
| 2006/0190949 A1 * | 8/2006 | Shimomae | 720/621 |
| 2007/0159724 A1 * | 7/2007 | Dorius et al. | 360/236.3 |
| 2008/0024924 A1 * | 1/2008 | Bolasna et al. | 360/236.2 |

\* cited by examiner

*Primary Examiner* — Allen T Cao

(57) ABSTRACT

An air-bearing surface of a hard disk drive slider comprises a trailing edge wherein a magnetic transducer is coupled to the air-bearing surface. A leading edge is opposite from the trailing edge. A channel is coupled to the air-bearing surface wherein the channel comprises: a closure at a distal end proximal to the leading edge; a bottom surface; and a center of the channel approximately aligned colinear with a center of the magnetic transducer. In this configuration the channel generates significantly more negative pressure proximal to the leading edge thereby stiffening the air bearing during operation.

25 Claims, 5 Drawing Sheets

THREE-ETCH ABS DESIGN WITH A CLOSED FRONT CHANNEL

TECHNICAL FIELD

This invention relates generally to the field of direct access storage devices and in particular to the design and fabrication of an air-bearing surface for a hard disk drive slider.

BACKGROUND ART

Direct access storage devices (DASD) have become part of every day life, and as such, expectations and demands continually increase for better performance at lower cost. To meet these demands, the mechano-electrical assembly in a DASD device, specifically the Hard Disk Drive (HDD) has evolved to meet these demands.

In order for an HDD to hold more data, advances in the magnetic transducer as well as the disk media on which the data is written have undergone major advances in the past few years. A critical relationship between the magnetic transducer and disk is the spacing between their adjacent surfaces. This is typically known as the fly height.

The magnetic transducer flies proximately to the disk by virtue of an air film created by the disk spinning next to a pattern on the surface of the HDD slider (and magnetic transducer contained there within). This pattern on the HDD slider is known as the air-bearing surface, or ABS. The ABS is fabricated on the surface of the slider that is closest to the disk. Typically the magnetic transducer resides at the end of the slider known as the trailing edge of the slider, so called the trailing edge because it is the last edge of the slider to fly proximately to the disk.

Control of the fly height is critical to the density of data that can be written onto the disk surface. Once the slider is flying above the disk surface, maintaining the desired fly height is critical to the operation of the HDD. Several conditions can arise that can change the fly height of the slider. The following examples are not intended to be an all-inclusive list of conditions that can affect fly height. These few examples are presented only for the sake of illustration, brevity and clarity. Mechanical shock entering the HDD can cause the ABS to become unstable and lose its ability to fly the slider properly. Debris can interact with the slider and change its fly height.

SUMMARY OF THE INVENTION

Various embodiments of the present invention are described herein. An air-bearing surface of a hard disk drive slider comprises a trailing edge wherein a magnetic transducer is coupled to the air-bearing surface. A leading edge is opposite from the trailing edge. A channel is coupled to the air-bearing surface wherein the channel comprises: a closure at a distal end proximal to the leading edge; a bottom surface; and a center of the channel approximately aligned colinear with a center of the magnetic transducer. In this configuration the channel generates significantly more negative pressure proximal to the leading edge thereby stiffening the air bearing during operation.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a brief overview of an air-bearing surface of a hard disk drive slider. The discussion will then focus on embodiments of the present invention by which a centrally located channel generates negative pressure proximal to the leading edge thereby stiffening the air bearing during operation and allows the ABS to be more robust for mechanical shock during operation. The implementation of embodiments of the present invention will then be discussed.

Overview

Figure 1:
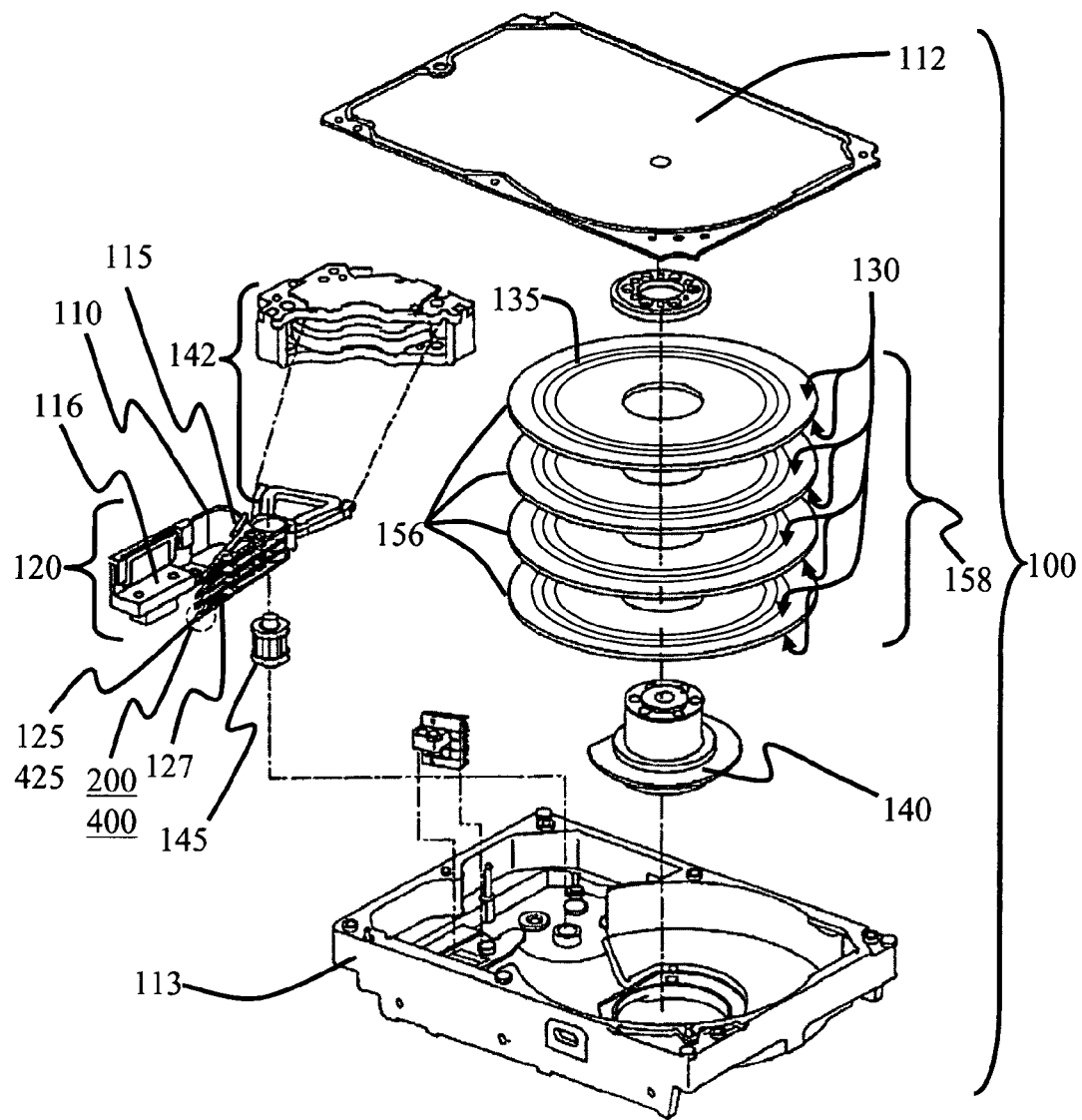
FIG. 1 is an isometric blow-apart of an HDD in accordance with one embodiment of the present invention.

With reference to FIG. 1, an isometric blow-apart of HDD 100 is shown in accordance with an embodiment of this invention. Base casting 113 provides coupling points for components and sub-assemblies such as disk stack 158, voice coil motor (VCM) 142, and actuator assembly 120. Disk stack 158 is coupled to base casting 113 by means of motor-hub assembly 140. Motor-hub assembly 140 will have at least one disk 156 coupled to it such that disk 156 can rotate about an axis common to motor-hub assembly 140 and the center of disk 156. Disk 156 has at least one surface 130 upon which reside data tracks 135. Actuator assembly 120 comprises in part suspension 127, which suspends hard disk drive slider (125, 425) next to disk surface 130, and connector 116, which conveys data between arm electronics (A/E) 115 and a host system wherein HDD 100 resides. Flex cable 110, which is part of actuator assembly 120, conveys data between connector 116 and A/E 115.

Actuator assembly 120 is coupled pivotally to base casting 113 by means of pivot bearing 145, such that VCM 142 can move HDD slider (125, 425) arcuately across data tracks 135. Upon assembly of actuator assembly 120, disk stack 158, VCM 142, and other components with base casting 113, cover 112 is coupled to base casting 113 to enclose these components and sub-assemblies into HDD 100.

Physical Description

Figure 2:
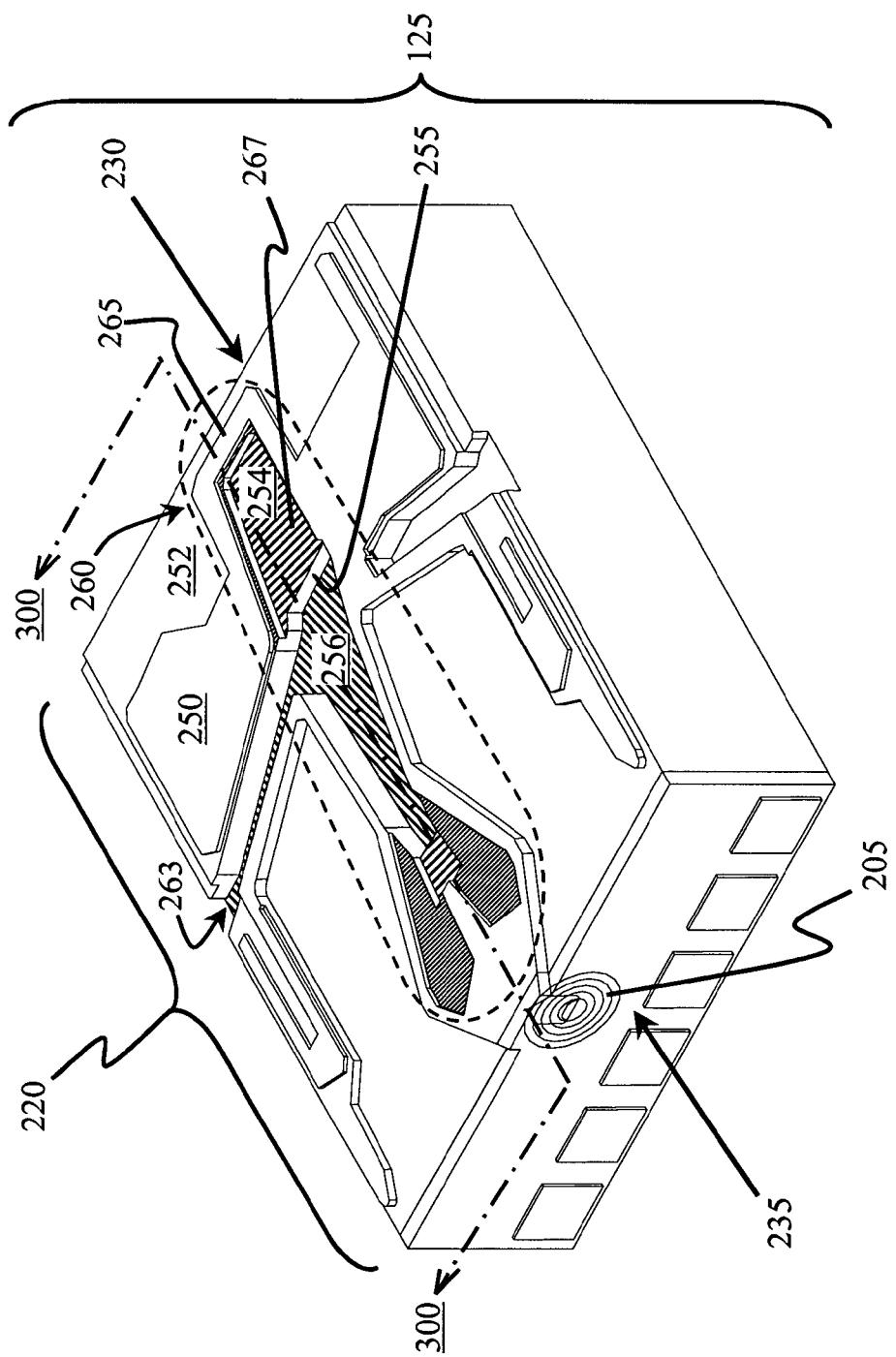
FIG. 2 is an isometric detail of an HDD slider in accordance with one embodiment of the present invention.
Figure 3:
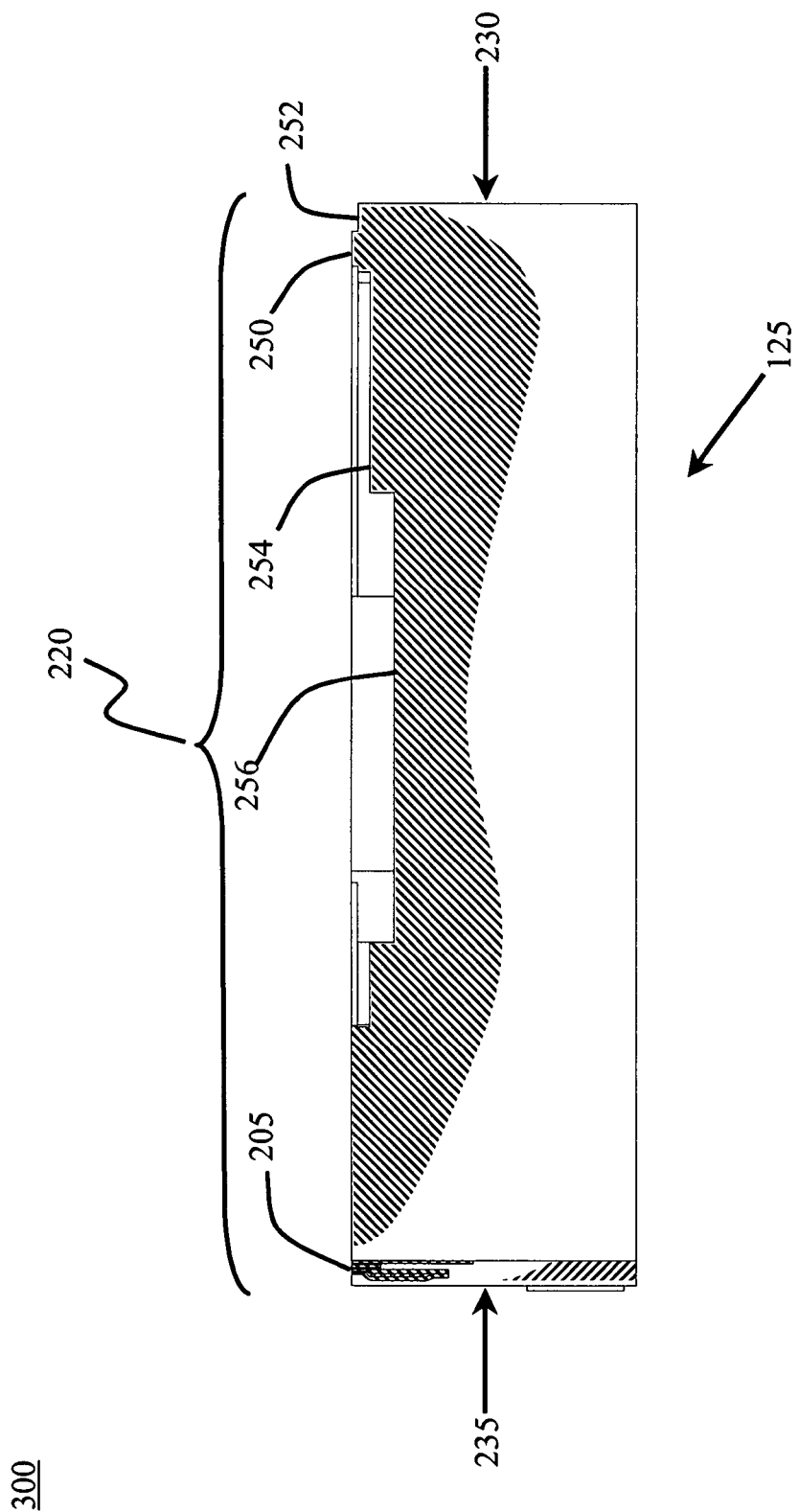
FIG. 3 is a cross-section of an HDD slider in accordance with one embodiment of the present invention.

With reference to FIG. 2 and FIG. 3, an isometric detail 200 and a cross-section 300 of slider 125 are presented in accordance with an embodiment of the present invention. For the sake of brevity and clarity, detail 200 presents slider 125 separately from suspension 127. Detail 200 and cross-section 300 have exaggerated scales to present more clearly the strata comprising air-bearing surface (ABS) 220.

Slider 125 comprises magnetic transducer 205, which writes and reads data tracks 135 onto disk surface 130, and ABS 220. In cooperation with suspension 127, ABS 220 provides a balance of forces that allow magnetic transducer 205 to be suspended by a film of air from disk surface 130. Maintaining a close spacing from disk surface 130 by means of an air film is typically referred to as flying.

ABS 220 comprises trailing edge 235. Magnetic transducer is deposited on trailing edge 235 by means of photolithographic and deposition processes well known in the industry. During the fabrication process of ABS 220, magnetic transducer 205 is exposed and coupled to ABS 220. A properly functioning ABS typically assures that the trailing edge along with the magnetic transducer is the part of the ABS that flies closest to the disk surface.

ABS 220 comprises leading edge 230. Leading edge 230 is so called the leading edge because it is the first edge of ABS 220 to fly proximally to disk surface 130. Leading edge 230 is at the opposite end of slider 125 from trailing edge 235.

Air entrained by spinning disk surface 130 enters ABS 220 mostly at leading edge 230. In accordance with an embodiment of the present invention, ABS 220 comprises multiple coplanar surfaces coupled in four strata 250, 252, 254, and 256. The patterns formed in strata 250, 252, 254, and 256 create topography that generates pressures zones, which are greater than and less than ambient pressure. These zones are typically known as positive and negative pressure zones. As air enters ABS 220 an air bearing forms that allows slider 125 to fly proximally to disk surface 130.

In accordance with an embodiment of the present invention, channel 260 is coupled to ABS 220. A channel is an opening in a surface that allows the entrance and exit of a fluid. For an ABS in accordance with embodiments of the present invention, the fluid is air entrained by a spinning disk surface. The entrained air passes a front closure that is part of the channel and enters into the channel at a surface that is approximately parallel to the spinning disk surface. The entrained air exits the channel from either the same surface comprising the entrance, a surface perpendicular to the surface comprising the entrance, or a combination of these surfaces. The channel may comprise a mid closure that restricts airflow through the channel.

With reference to FIG. 2, channel 260 comprises closure 265 at a distal end from magnetic transducer 205 and proximal to leading edge 230. The top most perimeter of channel 260 is coincident with stratum 250. Stratum 250 is the outermost stratum of ABS 220. Closed channel 260 comprises bottom surface 267, cross-hatched in FIG. 2. Bottom surface 267 comprises stratum 252 and/or 254.

Side channel 263 of channel 260 couples channel 260 to ambient air pressure. Step 255 is coincident with bottom surface 267. Step 255 is located between leading edge 230 and trailing edge 235 and is typically closer to leading edge 230 than to trailing edge 235. Step 255 can have a curvilinear profile or a profile that is parallel or non-parallel to leading edge 230 By having the combination of a front closure 265, a bottom surface 267, and a step 255, the channel 260 generates significantly more negative pressure proximal to the leading edge 230 than a channel without this combination.

In accordance with an embodiment of the present invention, the center of closed channel 260 is approximately aligned collinearly with the center of magnetic transducer 205, such that when assembled in HDD 100, the same location on disk surface 130 that passes proximally to closed channel 260 is the same location on disk surface 130 that passes proximally to magnetic transducer 205. Since closed channel 260 and magnetic transducer 205 are approximately aligned collinearly, cross-section 300 can present the bisection of both closed channel 260 and magnetic transducer 205.

Figure 4:
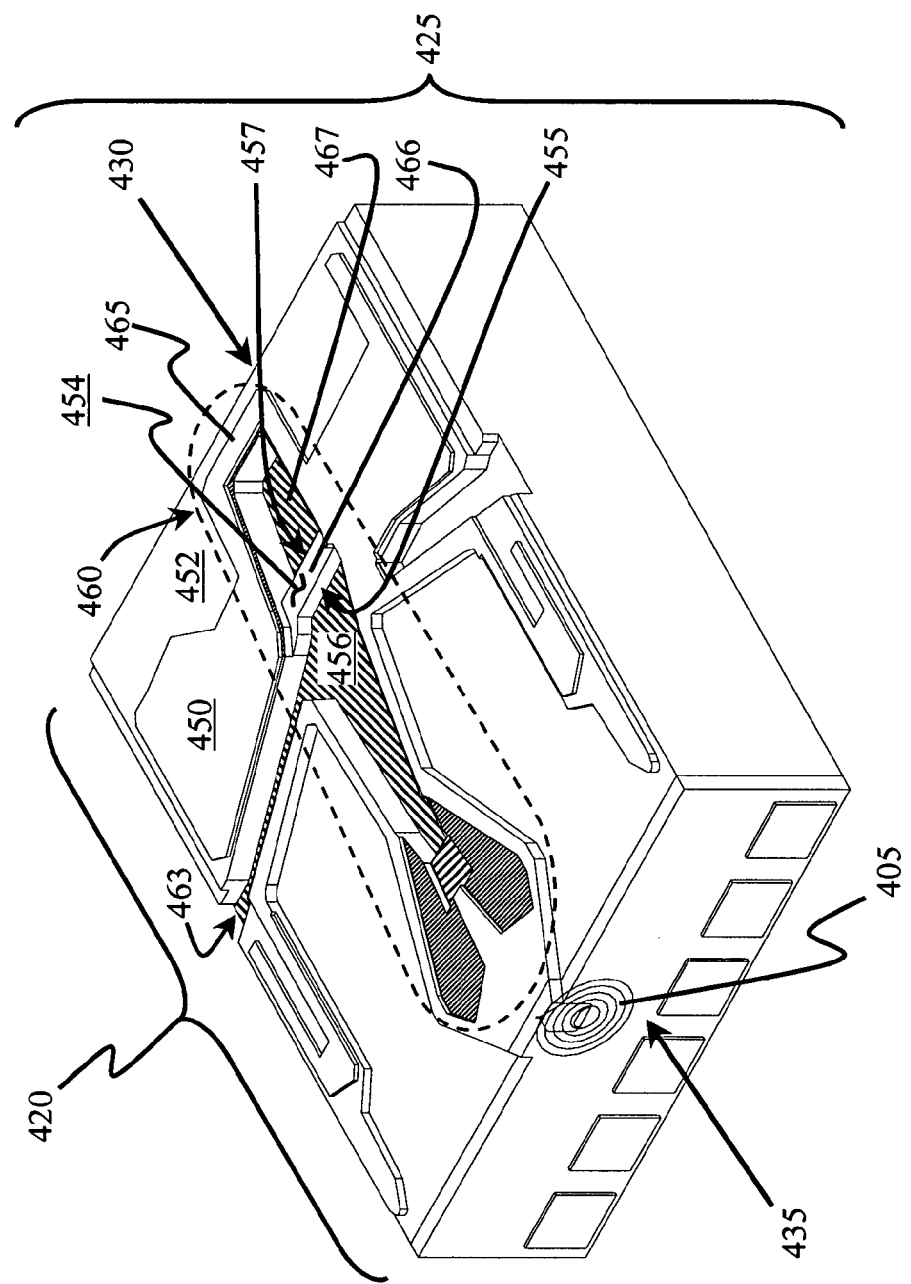
FIG. 4 is an isometric detail of an HDD slider in accordance with one embodiment of the present invention

With reference to FIG. 4, an isometric detail 400 of slider 425 is presented in accordance with an embodiment of the present invention. For the sake of brevity and clarity, detail 400 presents slider 425 separately from suspension 127. Detail 400 has an exaggerated scale to present more clearly the strata comprising air-bearing surface ABS 420.

Similar in construction and purpose to slider 125 of FIG. 2, slider 425 comprises magnetic transducer 405, trailing edge 435, leading edge 430, and ABS 420 comprising multiple coplanar surfaces coupled in four strata 450, 452, 454, and 456.

In accordance with an embodiment of the present invention, channel 460 is coupled to ABS 420. Channel 460 comprises front closure 465 at a distal end from magnetic transducer 405 and proximal to leading edge 430. Closed channel 460 further comprises mid closure 466 between front closure 465 and trailing edge 435.

The top most perimeter of closed channel 460 is coincident with stratum 450. Stratum 450 is the outermost stratum of ABS 420. Closed channel 460 comprises bottom surface 467, cross-hatched in FIG. 4. Bottom surface 467 comprises stratum 452, 454, or 456. In accordance with an embodiment of the present invention, bottom surface 467 comprises strata 452 and 454, or strata 454 and 456, or strata 452, 454, and 456.

In accordance with an embodiment of the present invention, mid closure 466 may be continuous as shown in FIG. 4 or may comprise a discontinuity. A discontinuity is defined as a hole, notch, or curvilinear profile which may extend to another strata.

Side channel 463 of channel 460 couples channel 460 to ambient air pressure. Trailing step 455 and leading step 457 are coincident with bottom surface 467. Trailing step 455 and leading step 457 are located between leading edge 430 and trailing edge 435 and are typically closer to leading edge 430 than to trailing edge 435. Trailing step 455 and leading step 457 can have a curvilinear profile or a profile that is parallel or non-parallel to leading edge 430. Leading step 457 typically does not encroach into side channel 463. By having the combination of a front closure 465, a bottom surface 467, and a mid closure 466, the channel 460 generates significantly more negative pressure proximal to the leading edge 230 than a channel without this combination.

Mid closure 466 comprises stratum 450, 452, or 454. The outer most stratum of mid closure 466 is between stratum 450 and stratum 456, and typically closer to strata 450 than bottom surface 467.

In accordance with an embodiment of the present invention, the center of closed channel 460 is approximately aligned collinearly with the center of magnetic transducer 405, such that when assembled in HDD 100, the same location on disk surface 130 that passes proximally to closed channel 460 is the same location on disk surface 130 that passes proximally to magnetic transducer 405.

One of ordinary skill in the art will appreciate that the perimeter and feature profiles of closed channel (260, 460) is not confined to the perimeters and feature profiles presented in detail (200, 400). Numerous variations on the perimeter and feature profiles of closed channel (260, 460) can be contrived and fabricated that would be encompassed by the spirit of embodiments of the present invention. One of ordinary skill in the art will also appreciate that bottom surface (267, 467) may also have various combinations and shapes of stratum 252, 254, and/or 256, and stratum 452, 454, and/or 456 contrived and fabricated without deviating from the spirit of the embodiments of the present invention.

It is also to be appreciated that stratum (250, 450) is the outermost strata of ABS (220, 420). During the coupling of magnetic transducer (205, 405) to ABS (220, 420), recession of magnetic transducer (205, 405) from ABS (220, 420) known in the art as pole-tip recession may occur. Pole-tip recession is not to be interpreted as strata in embodiments of this invention.

Operation

Figure 5:
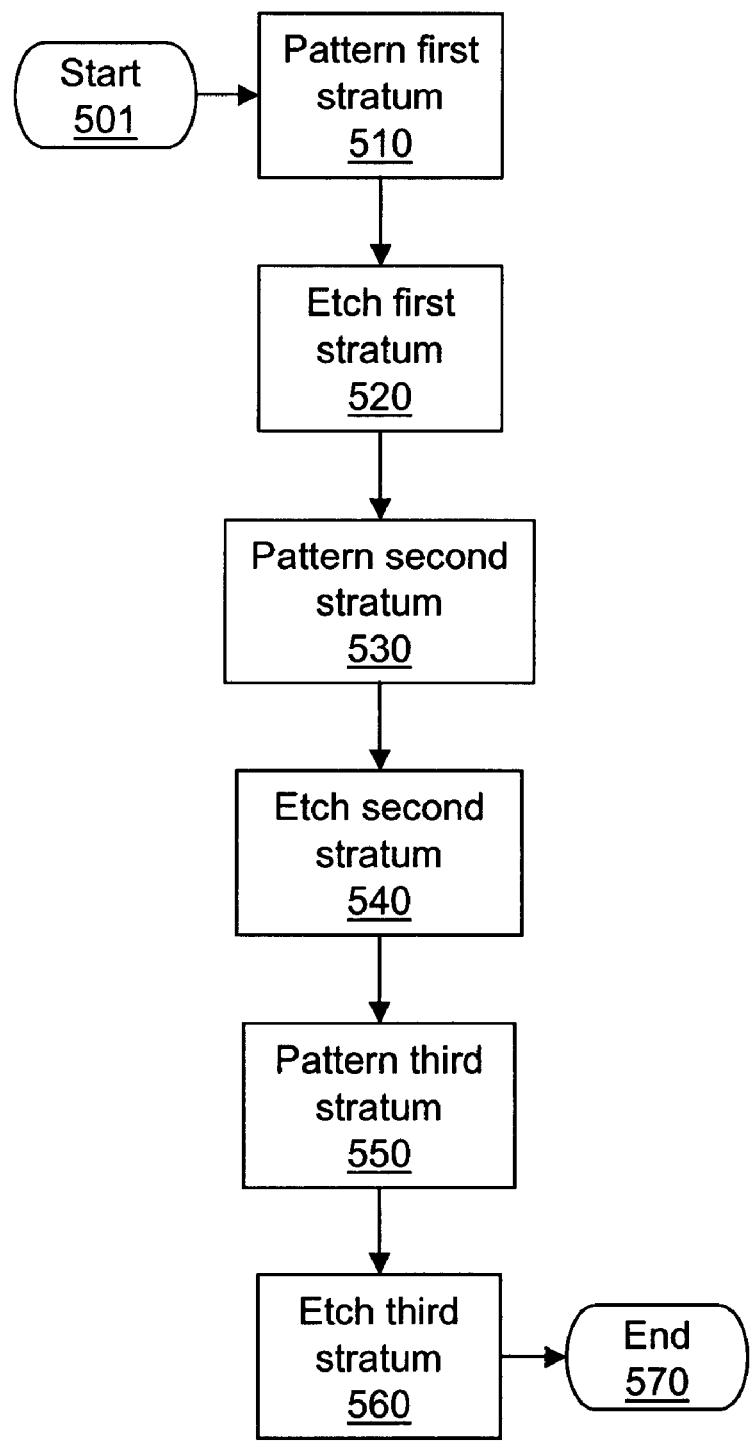
FIG. 5 is a flow chart illustrating steps of a fabrication process for an air-bearing surface of an HDD slider in accordance with one embodiment of the present invention.

FIG. 5 is a flow chart of a process 500 in which particular steps are performed in accordance with an embodiment of the present invention for fabricating an ABS of an HDD slider such that the channel generates negative pressure proximal to the leading edge thereby stiffening the air bearing during operation. Although specific steps are disclosed in process 500, such steps are exemplary. That is, the embodiment(s) of the present invention is well suited to performing various other steps or variations of the steps recited in FIG. 5. Within the present embodiment, it should be appreciated that the steps of process 500 may be performed by software, by hardware, by an assembly mechanism, through human interaction, or by any combination of software, hardware, assembly mechanism, and human interaction.

Process 500 will be described with reference to elements shown in FIG. 2 and FIG. 4.

In step 501 of process 500, a suitable substrate is introduced into process 500 in an embodiment of the present invention. A suitable substrate for fabricating an ABS in a process such as process 500 is an array of sliders wherein first and outermost stratum (250, 450) has been fabricated and magnetic transducer (205, 405) is exposed and coupled to first stratum (250, 450).

In step 510 of process 500, first stratum (250, 450) is patterned in an embodiment of the present invention. Photolithographic processes, which are well known in the art are typically used to pattern first stratum (250, 450). The pattern in step 510 comprises patterns of features, such as the pattern for the perimeter of closed channel (260, 460) at leading edge (230, 430) of slider (225, 425) that will be etched into first stratum (250, 450).

In step 520 of process 500, first stratum (250, 450) is etched in an embodiment of the present invention. Various etching processes are well known in the art. Examples of these are reactive ion etching; commonly known as RIE; deep RIE or DRIE; and ion milling. The etching of first stratum (250, 450) in step 520 comprises defining the boundary to the perimeter of closed channel (260, 460) at leading edge (230, 430) of slider (225, 425). At the completion of step 520, second stratum (252, 452) is also defined. The distance from second stratum (252, 452) to first stratum (250, 450) is typically in the range of 0.10 to 0.22 microns. For better performance of ABS (220, 420) the preferred range comprises 0.12 to 0.18 microns.

In step 530 of process 500, second stratum (252, 452) is patterned in an embodiment of the present invention. Photolithographic processes, which are well known in the art are typically used to pattern second stratum (252, 452). The pattern in step 530 comprises patterns of features, such as the pattern for the perimeter of closed channel (260, 460) at leading edge (230, 430) of slider (225, 425) that will be etched into second stratum (252, 452).

In step 540 of process 500, second stratum (252, 452) is etched in an embodiment of the present invention. Various etching processes are well known in the art. Examples of these are reactive ion etching; commonly known as RIE; deep RIE or DRIE; and ion milling. The etching of second stratum (252, 452) in step 530 comprises defining the boundary to the perimeter of closed channel (260, 460) at leading edge (230, 430) of slider (225, 425). At the completion of step 540, third stratum (254, 454) is also defined. The distance from third stratum (254, 454) to first stratum (250, 450) is typically in the range of 0.37 to 1.37 microns. For better performance of ABS (220, 420) the preferred range comprises 0.50 to 0.87 microns.

In step 550 of process 500, third stratum (254, 454) is patterned in an embodiment of the present invention. Photolithographic processes, which are well known in the art are typically used to pattern second stratum (252, 452). The pattern in step 550 comprises patterns of features, such as the pattern for the perimeter of closed channel (260, 460) at leading edge (230, 430) of slider (225, 425) that will be etched into third stratum (254, 454).

In step 560 of process 500, third stratum (254, 454) is etched in an embodiment of the present invention. Various etching processes are well known in the art. Examples of these are reactive ion etching; commonly known as RIE; deep RIE or DRIE; and ion milling. The etching of third stratum (254, 454) in step 560 comprises defining the boundary to the perimeter of closed channel (260, 460) at leading edge (230, 430) of slider (225, 425). At the completion of step 560, fourth stratum (256, 456) is also defined. The distance from fourth stratum (256, 456) to first stratum (250, 450) is typically in the range of 2.00 to 5.37 microns. For better performance of ABS (220, 420) the preferred range comprises 2.70 to 4.23 microns.

In step 570 of process 500 the fabrication of ABS (220, 420) of HDD slider (125, 425) is complete in an embodiment of the present invention, such that the channel generates negative pressure proximal to the leading edge thereby stiffening the air bearing during operation.

Process 500 presents a series of patterning and etching steps. One of ordinary skill in the art will realize that the embodiments of the present invention are not limited to etching to form strata. Without deviating from the spirit of embodiments of the present invention, strata may also be fabricated through additive processes such as evaporation, chemical vapor deposition, RF sputter deposition or any one of several deposition processes known in the art.

In the design of an ABS, decisions are made in the configuration of patterns on the ABS that will affect the overall performance of the ABS. As previously mentioned, the patterns formed create topography that generates pressures zones, which are greater than and less than ambient pressure, i.e. positive and negative pressure. The balance of these positive and negative pressures along with external forces exerted by the suspension comprise a set of forces that determine the fly height of the magnetic transducer above the disk surface as well as the stability of flying that the ABS provides. Designing closed channel (260, 460) wider or deeper increases the negative pressure zone. By properly balancing increases in negative pressure from closed channel (260, 460), increased stability in the air bearing produced by ABS (220, 420) are achieved.

What is claimed is:

1. An air-bearing surface of a hard disk drive slider comprising:
   a trailing edge wherein a magnetic transducer is coupled to said air-bearing surface;

a leading edge oppositely positioned from said trailing edge;

a channel coupled to said air-bearing surface wherein said channel comprises:

a front closure at a distal end from said magnetic transducer, proximal to said leading edge;

a bottom surface; and a center of said channel approximately aligned collinearly with a center of said magnetic transducer, such that said channel generates significantly more negative pressure proximal to said leading edge thereby stiffening the air bearing during operation.

2. The air-bearing surface of claim 1 wherein said air-bearing surface comprises multiple coplanar surfaces coupled in four strata.

3. The air-bearing surface of claim 1 wherein said channel comprises a perimeter that is coincident to a first and outermost stratum of said air-bearing surface.

4. The air-bearing surface of claim 1 wherein said channel bottom surface comprises a second stratum separated from said first stratum at a distance in the range of 0.10 to 0.22 microns.

5. The air-bearing surface of claim 1 wherein said channel bottom surface comprises a third stratum separated from said first stratum at a distance in the range of 0.37 to 1.37 microns.

6. The air-bearing surface of claim 1 wherein said channel bottom surface comprises a fourth stratum separated from said first stratum at a distance in the range of 2.00 to 5.37 microns.

7. The air-bearing surface of claim 1 wherein said channel bottom surface comprises said third stratum and said fourth stratum.

8. The air-bearing surface of claim 1 wherein said channel further comprises a mid closure between said front closure and said trailing edge.

9. The air-bearing surface of claim 4 wherein said range comprises 0.12 to 0.18 microns.

10. The air-bearing surface of claim 5 wherein said range comprises 0.50 to 0.87 microns.

11. The air-bearing surface of claim 6 wherein said range comprises 2.70 to 4.23 microns.

12. A hard disk drive comprising:

a base casting for providing coupling points for components and sub-assemblies of said hard disk drive;

a motor-hub assembly to which at least one disk is coupled allowing rotation of said disk about an axis approximately perpendicular and centered to said disk, wherein said motor-hub assembly is coupled to said base casting, wherein said disk comprises at least one surface of data tracks; and a slider coupled to said base casting by means of a suspension and an actuator such that said slider is arcuately moved across said data tracks, wherein said slider comprises:

a trailing edge wherein a magnetic transducer is coupled an air-bearing surface of said slider;

a leading edge oppositely positioned from said trailing edge;

a channel coupled to said air-bearing surface wherein said channel comprises:

a front closure at a distal end proximal to said leading edge;

a bottom surface; and a center of said channel approximately aligned colinear with a center of said magnetic transducer, such that said channel generates significantly more negative pressure proximal to said leading edge thereby stiffening the air bearing during operation.

13. The hard disk drive of claim 12 wherein said air-bearing surface comprises multiple coplanar surfaces coupled in four strata.

14. The hard disk drive of claim 12 wherein said channel comprises a perimeter that is coincident to a first and outermost stratum of said air-bearing surface.

15. The hard disk drive of claim 12 wherein channel bottom surface comprises a second stratum separated from said first stratum at a distance in the range of 0.10 to 0.22 microns.

16. The hard disk drive of claim 12 wherein said channel bottom surface comprises a third stratum separated from said first stratum at a distance in the range of 0.37 to 1.37 microns.

17. The hard disk drive of claim 12 wherein said channel bottom surface comprises a fourth stratum separated from said first stratum at a distance in the range of 2.00 to 5.37 microns.

18. The hard disk drive of claim 12 wherein said channel bottom surface comprises said third stratum and said fourth stratum.

19. The hard disk drive of claim 12 wherein said channel further comprises a mid closure between said front closure and said trailing edge.

20. The hard disk drive slider of claim 15 wherein said range comprises 0.12 to 0.18 microns.

21. The hard disk drive slider of claim 16 wherein said range comprises 0.50 to 0.87 microns.

22. The hard disk drive slider of claim 17 wherein said range comprises 2.70 to 4.23 microns.

23. A method of fabricating an air-bearing surface of a hard disk drive slider such that said channel generates significantly more negative pressure proximal to said leading edge thereby stiffening the air bearing during operation comprising:

patterning a first stratum on said slider such that a first pattern comprises a closed channel at a leading edge of said slider;

etching said first pattern into said first stratum thereby defining a boundary of said closed channel;

patterning a second stratum on said slider such that a second pattern further comprises a closed channel at a leading edge of said slider;

etching said second pattern into said second stratum thereby further defining said boundary and defining a bottom surface of said closed channel;

patterning a third stratum on said slider such that a third pattern further comprises a closed channel at a leading edge of said slider; and etching said third pattern into said second stratum thereby further defining said boundary and further defining said bottom surface of said closed channel.

24. The method of claim 23 wherein said defining said boundary comprises etching a closure at a distal end of said channel proximal to a leading edge of said slider.

25. The method of claim 23 wherein said defining said boundary further comprises etching a closure opposite said distal end and proximal to a magnetic transducer of said slider.

* * * * *